United States Patent [19]
Dodge, Jr.

[11] Patent Number: 6,095,502
[45] Date of Patent: Aug. 1, 2000

[54] LINE GRIP WITH ELONGATED CAMS

[76] Inventor: Cleveland Dodge, Jr., R.D. 1, Box 7, Pownal, Vt. 05261

[21] Appl. No.: 09/292,160

[22] Filed: Apr. 15, 1999

Related U.S. Application Data

[60] Provisional application No. 60/081,912, Apr. 15, 1998.

[51] Int. Cl.$^7$ .................................................. B66D 3/04
[52] U.S. Cl. .......................... 254/389; 182/5; 188/65.1
[58] Field of Search .................................... 254/389, 390, 254/391; 188/65.1, 65.2; 182/5

[56] References Cited

U.S. PATENT DOCUMENTS

| | | | |
|---|---|---|---|
| 2,933,157 | 4/1960 | Huber | 182/5 X |
| 3,177,544 | 4/1965 | Murdock | 188/65.1 |
| 3,492,702 | 2/1970 | Stafford | 182/5 X |
| 3,811,155 | 5/1974 | Stafford | 182/5 X |
| 3,852,943 | 12/1974 | Healy | 188/65.1 X |
| 4,881,622 | 11/1989 | Machal | 188/65.1 X |
| 4,923,037 | 5/1990 | Stephenson et al. | 188/65.1 X |
| 5,636,704 | 6/1997 | Castanda | 182/5 |
| 5,860,493 | 1/1999 | Cherpitel | 188/65.2 |
| 5,924,522 | 7/1999 | Ostrobod | 182/5 X |

*Primary Examiner*—Donald P. Walsh
*Assistant Examiner*—Emmanuel M. Marcelo
*Attorney, Agent, or Firm*—Handal & Morofsky

[57] ABSTRACT

A rope grip having a receiving member with a pair of substantially parallel side walls spaced apart a distance sufficient to receive a rope therebetween. The side walls are joined along one side edge thereof so as to define a first engagement. An engagement member slidably received within the side walls and having a second engagement surface and being in a facial spaced relationship with regard to the first engagement surface. A movement restricting member, is positioned to define and restrict the movement of the engagement member within the pair of side walls. An actuating arm having a first end and a second end is secured to the engagement member in such a manner to allow for pivotal movement of the actuating arm, whereby the first end moves in response to a force exerted upon the second end and the first end makes contact with the receiving member causing the engagement member to move within the pair of side walls, such movement of the engagement member causes the second engagement surface to either move closer to or further away from the first engagement surface and accordingly secure or release the rope grip from the rope. A pair of planar members are secured to and depend away from the second engagement surface. The planar members are angularly positioned with respect to the second engagement surface and allow the rope to be angularly displaced with respect to the rope grip. Such placement of the planar members prevents the rope grip from damaging the rope when the rope grip is secured to the rope.

12 Claims, 6 Drawing Sheets

LINE GRIP WITH ELONGATED CAMS

This appln claims the benefit of U.S. Provisional No. 60/081,912 filed Apr. 15, 1998.

TECHNICAL FIELD

The present invention relates to a line grip for reducing the likelihood that a workman and or a scaffolding will fall to the ground in the event of an accident.

SUMMARY OF THE INVENTION

The present invention is an improvement to the line grip disclosed in U.S. Pat. No. 3,492,702, directed to a line grip device, the contents of which are hereby incorporated herein by reference thereto.

The present invention, is intended to provide an improved rope grip construction over the above-identified U.S. patent. The features of the invention will be apparent from the accompanying drawings and the following detailed description.

BRIEF DESCRIPTION OF THE DRAWINGS

One way of carrying out the invention is described in detail below with reference to drawings which illustrate a specific embodiment of the invention.

DETAILED DESCRIPTION OF THE PREFERRED EMBODIMENTS

Figure 1:
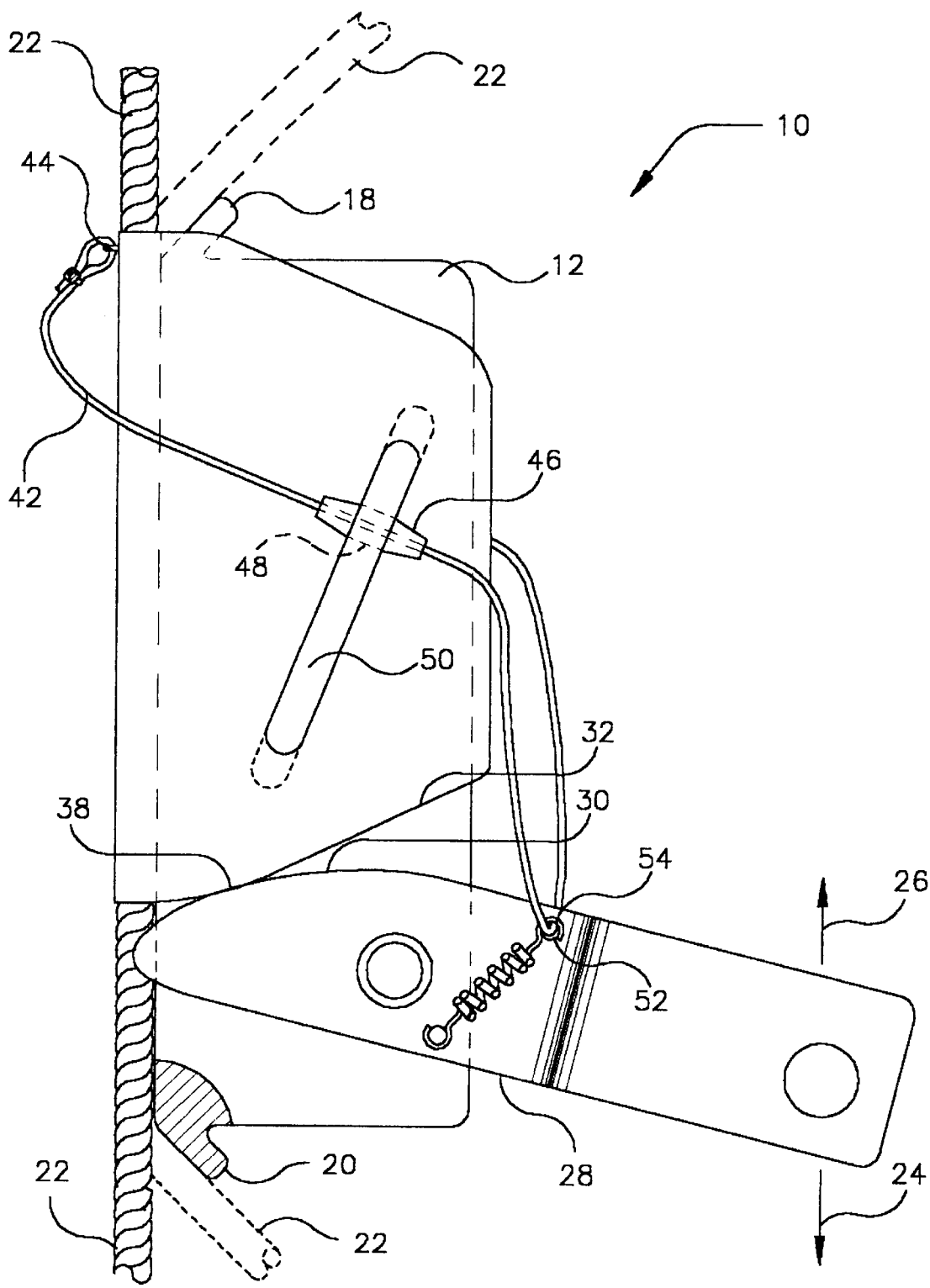
FIG. 1 is a side view of an inventive rope grip.

Referring to FIG. 1, the improved line grip 10 comprises an improved wedge plate 12. Wedge plate 12 is preferably manufactured from stainless steel. The steel is filed and polished to remove any burrs or imperfections.

Figure 2:
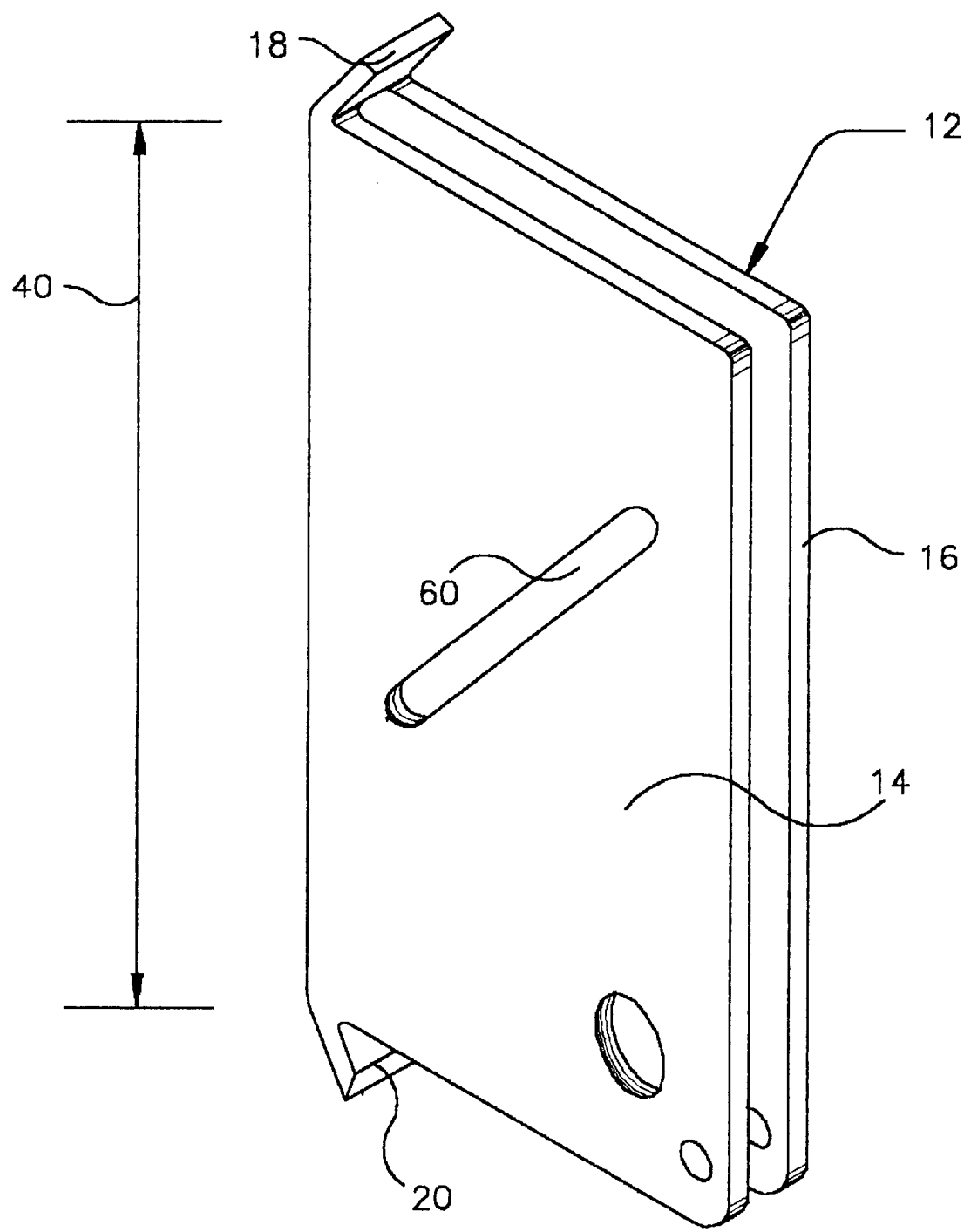
FIG. 2 is a perspective view of component parts of the inventive line grip.

Wedge plate 12 is configured to have a U-shaped configuration which includes a pair of planar members 14 and 16 (as illustrated in FIG. 2). This U-shaped configuration allows plate 12 to be stamped and folded over, a manufacturing process which is more economical and efficient than machining a solid wedge plate from solid stock. In addition, wedge plate 12 is constructed to have a pair of extending tabs 18 and 20 which are part of the original flat stamping. Tabs 18 and 20 prevent wedge plate 12 from damaging line 22 by increasing the radius of curvature around which line 22 is bent. Line 22 which may be a cable made of steel or a rope. In particular and when a line 22, is in a position, as illustrated by the dashed lines in FIG. 1, tabs 18 and 20 allow line 22 to maintain such a position wherein the corners of wedge plate 12 are prevented from damaging line 22. In addition, the line is guided to run easily and smoothly through the grip without undue wear.

This allows rope grip 10 to engage line 22 and also prevents line 22 from being damaged when its position with respect to grip 10 is changed either by the locking moment force in the direction of arrow 24 or from the release moment force in the direction of arrow 26.

Figure 3:
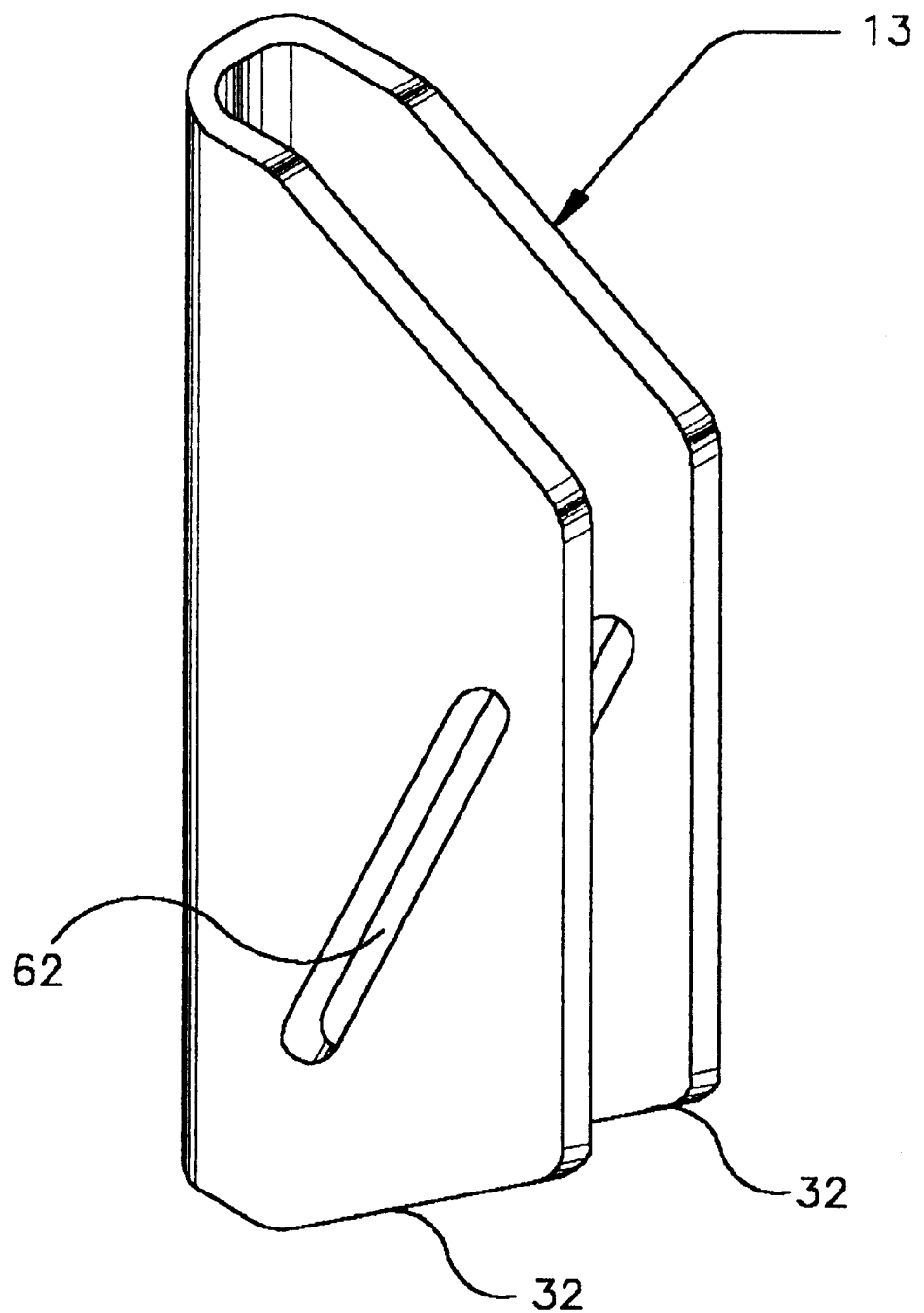
FIG. 3 is a perspective view of component parts of the inventive line grip.
Figure 4:
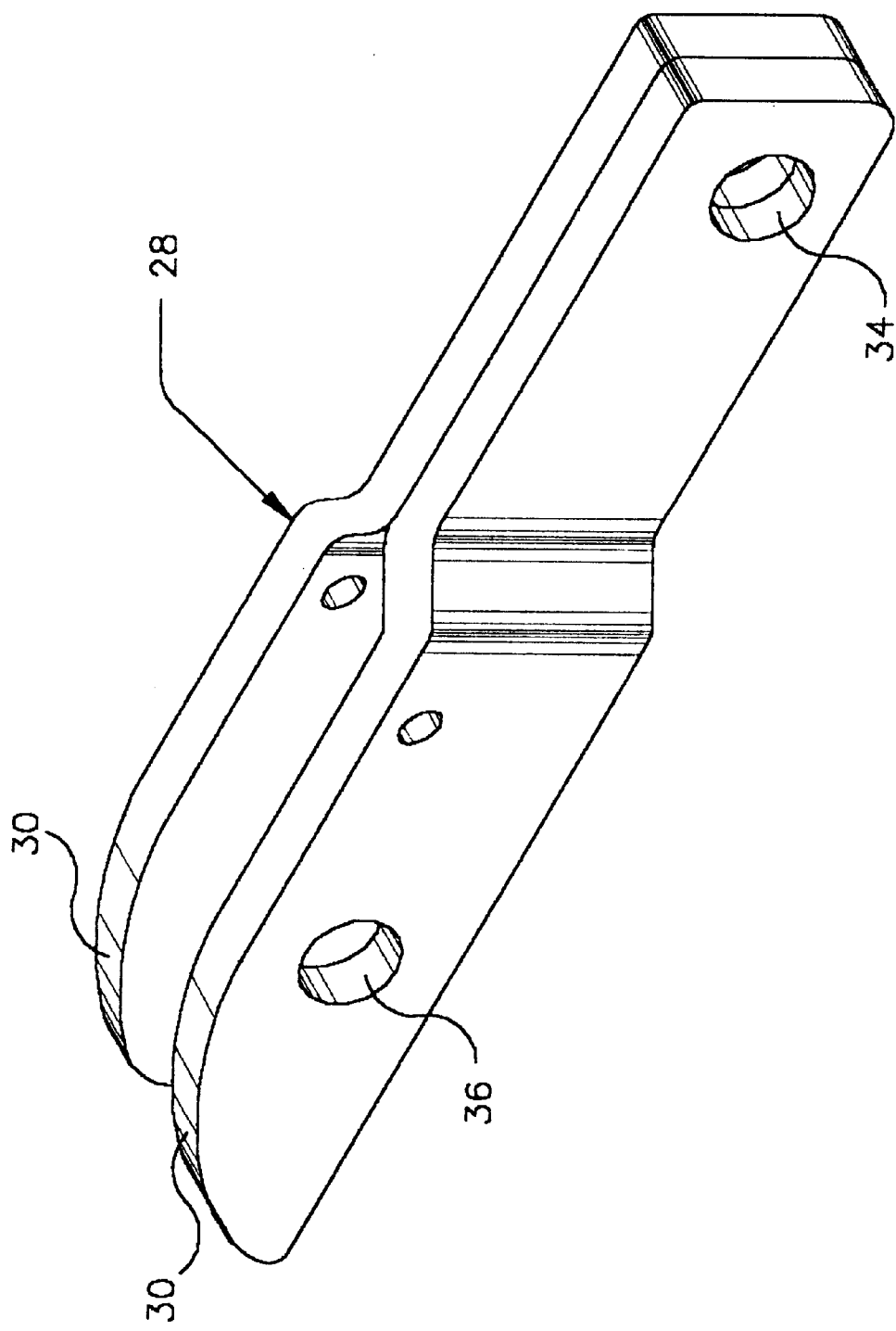
FIG. 4 is a perspective view of component parts of the inventive line grip.

Yet another improvement is that arm 28 is configured to have a reduced sloping engagement surface 30 which makes contact with a reduced sloping surface 32 of grip 10. Such improvements to sloping surfaces 30 and 32, are illustrated in FIGS. 3 and 4. These improvements provide surfaces 30 and 32 with a smaller degree of inclination to facilitate the engagement of grip 10. In addition and referring to FIG. 4, the sloping surfaces 30 of arm 28 extend beyond wedge plate 12, as also illustrated in FIG. 1, thereby preventing any lateral movement of line 22.

Additionally, the positioning of opening 34 has been extended to a greater distance from the positioning of opening 36. This feature provides arm 28 with a greater moment which in turn provides an enhanced force at a point 38, as illustrated in FIG. 1. Point 38 is the point of contact between sloping arm surfaces 30 and sloping surfaces 32.

Referring now to FIG. 2, engagement plate 12 has also been extended to have a greater relative dimension in the direction indicated by arrow 40 along which dimension the force is distributed. This greater distance also prevents damage to line 22 because any movement of line 22 is reduced due to the larger surface area from shell 13 and tab 20 and its attendant greater frictional force.

Figure 5:
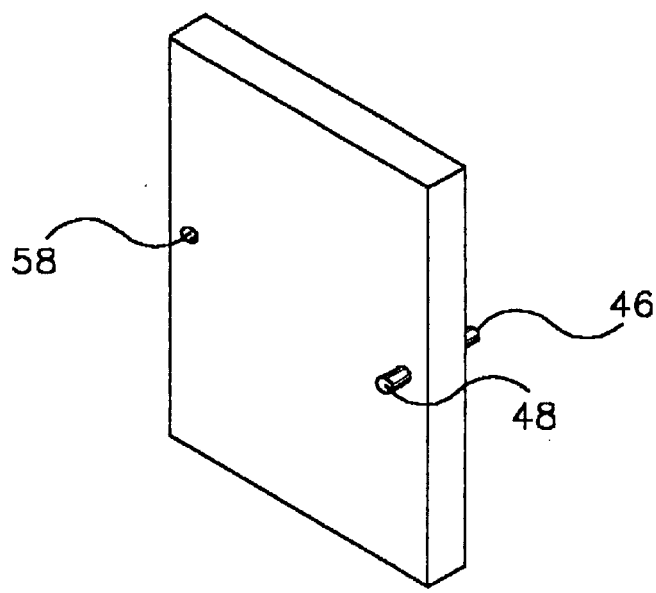
FIG. 5 is a perspective view of component parts of the inventive line grip.
Figure 6:
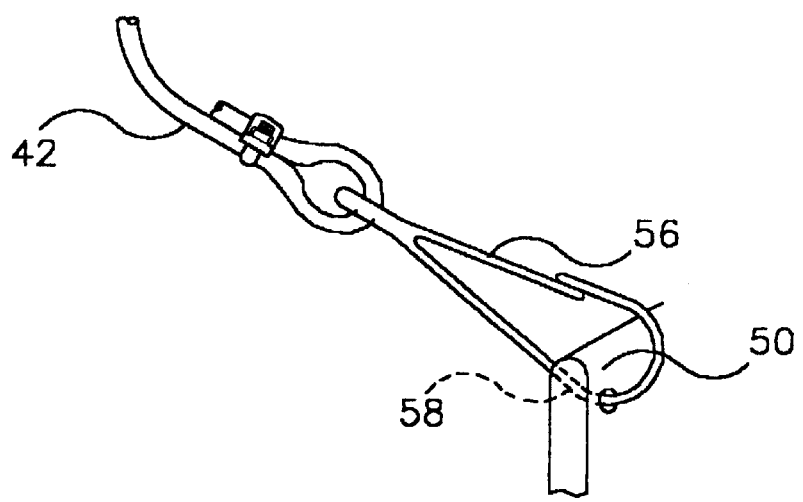
FIG. 6 is a perspective view of component parts of the inventive line grip.

Referring now to FIG. 1, a cable 42 is secured to an eyelet 44. Cable 42 passes through a bushing 46 which is secured to an opening 48 in plate 50. Cable 42 then passes through another bushing 52 secured in an opening 54 in arm 28. Cable 42 is then secured at its other end to a curved pin 56 (as illustrated in FIGS. 5 and 6) which passes through an opening 58 (as illustrated in FIGS. 5 and 6) or the other end of plate 50. Accordingly, pin 56 allows for the removal of plate 50 and along with cable 42 and bushing 46 also serves to retain plate 50 in rope grip 10.

Still yet another improvement is the angular positioning of openings 60 and 62 in engagement plate 12 and outer shell 13 of grip 10. With such an angular positioning, plate 50 is angularly oriented to operate grip 10 in an ultimate gripping and release configuration.

Figure 8:
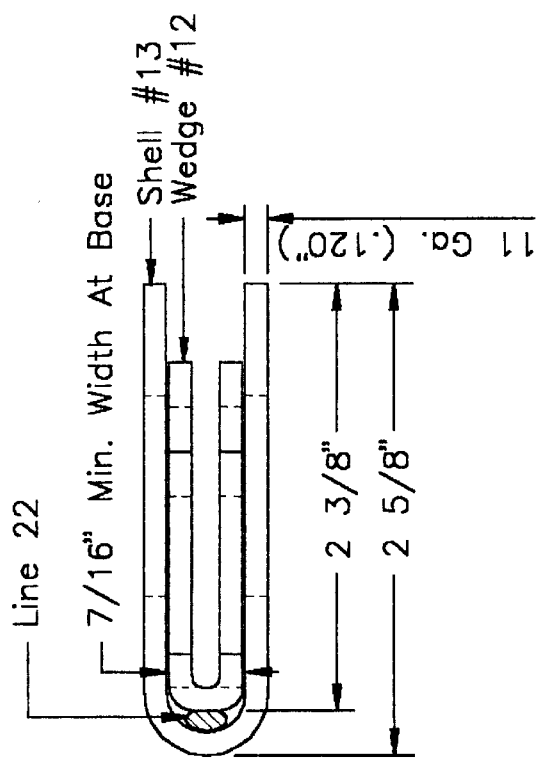
FIG. 8 is a top view of component parts of the inventive line grip.
Figure 7:
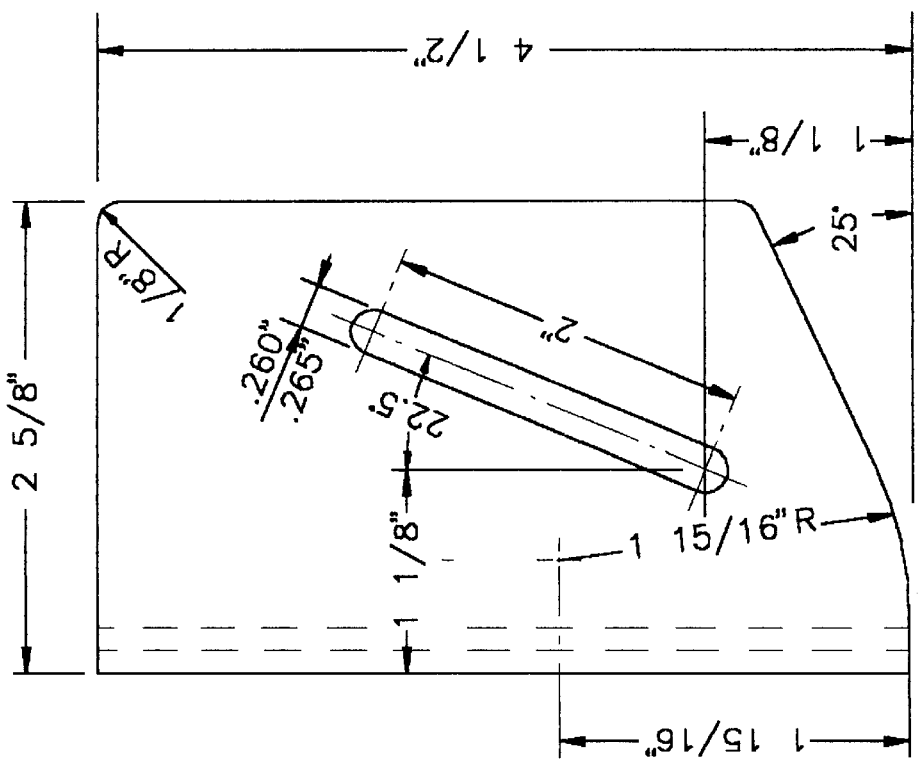
FIG. 7 is a side view of component parts of the inventive line grip.

FIGS. 7 and 8 provide exemplary dimensions of component parts of line grip 10 which may of course vary widely, as will be apparent to those skilled in the art, having regard to the teaching herein.

While an illustrative embodiment of the invention has been described, various modifications will be obvious to those skilled in the art. Such modifications are within the spirit and scope of the present invention which is limited and defined only by the appended claims.

What is claimed is:

1. A rope grip comprising:
   a) a receiving member having a pair of substantially parallel side walls spaced apart a distance sufficient to receive a rope therebetween, said pair of side walls being joined along one side edge thereof so as to define a first engagement surface in-between said pair of side walls;
   b) an engagement member configured and dimensioned to be slidably received within said pair of side walls, said engagement member defining a second engagement surface, said second engagement surface being in a facial spaced relationship with regard to said first engagement surface;

c) a movement restricting member, said movement restricting member being configured, dimensioned and positioned to define and restrict the movement of said engagement member within said pair of side walls;

d) an actuating arm having a first end and, a second end and being secured to said engagement member in such a manner to allow for pivotal movement of said actuating arm, whereby said first end moves in response to a force exerted upon said second end and said first end makes contact with said receiving member whereby the movement of said first end causes said engagement member to move within said pair of side walls, such movement of said engagement member causes said second engagement surface to either move closer to or further away from said first engagement surface and accordingly secure or release said rope grip from said rope; and e) said first end of said actuating arm is configured and dimensioned to have an elongated cam surface, said elongated cam surface making contact with said receiving member and extending beyond said second engagement surface of said engagement member.

2. A rope grip as in claim 1, wherein said engagement member is stamped out of a single piece of metal and is folded along a line and said line defines said second engagement surface.

3. A rope grip as in claim 1, further comprising:

a pair of planar members secured to and depending away from said second engagement surface, said planar members being configured, dimensioned and positioned to allow for said rope to be angularly displaced with respect to said rope grip whereby said planar members provide a planar surface to make contact with said rope as it is being angularly displaced.

4. A rope grip as in claim 1, wherein said receiving member is configured to have an elongated cam surface whereby said cam surfaces make contact with each other in order to facilitate the movement of said engagement member with respect to said receiving member.

5. A rope grip as in claim 1, wherein said first end of said actuating arm is configured and dimensioned to have a reduced sloping engagement surface, said surface making contact with said receiving member.

6. A rope grip as in claim 1, wherein said receiving member is configured to have a reduced sloping engagement surface, said surface making contact with said actuating arm in order to facilitate the movement of said engagement member with respect to said receiving member.

7. A rope grip comprising:

a) a receiving member having a pair of substantially parallel side walls spaced apart a distance sufficient to receive a rope therebetween, said pair of side walls being joined along one side edge thereof so as to define a first engagement surface in-between said pair of side walls;

b) an engagement member configured and dimensioned to be slidably received within said pair of side walls, said engagement member defining a second engagement surface, said second engagement surface being configured, dimensioned and positioned to provide a planar surface for said rope to make contact with as said rope is angularly displaced with respect to said rope grip, said second engagement surface being in a facial spaced relationship with regard to said first engagement surface;

c) a movement restricting member, said movement restricting member being configured, dimensioned and positioned to define and restrict the movement of said engagement member within said pair of side walls;

d) an actuating arm having a first end and, a second end and being secured to said engagement member in such a manner to allow for pivotal movement of said actuating arm, whereby said first end moves in response to a force exerted upon said second end and said first end makes contact with said receiving member whereby the movement of said first end causes said engagement member to move within said pair of side walls, such movement of said engagement member causes said second engagement surface to either move closer to or further away from said first engagement surface and accordingly secure or release said rope grip from said rope; and e) a pair of planar members secured to and depending away from said second engagement surface, said planar members being configured, dimensioned and positioned to allow for said rope to be angularly displaced with respect to said rope grip whereby said planar members provide a planar surface to make contact with said rope as it is being angularly displaced.

8. A rope grip as in claim 7, wherein said first end of said actuating arm is configured and dimensioned to have an elongated cam surface, said cam surface making contact with said receiving member.

9. A rope grip as in claim 7, wherein said receiving member is configured to have an elongated cam surface whereby said cam surfaces make contact with each other in order to facilitate the movement of said engagement member with respect to said receiving member.

10. A rope grip as in claim 7, wherein said first end of said actuating arm is configured and dimensioned to have a reduced sloping engagement surface, said surface making contact with said receiving member.

11. A rope grip as in claim 7, wherein said receiving member is configured to have a reduced sloping engagement surface, said surface making contact with said actuating arm in order to facilitate the movement of said engagement member with respect to said receiving member.

12. A rope grip as in claim 7, wherein said engagement member is stamped out of a single piece of metal and is folded along a line and said line defines said second engagement surface.

* * * * *